March 5, 1935. F. U. WINCHESTER ET AL. Re. 19,492

NUT AND CUP WASHER ASSEMBLY

Original Filed March 13, 1931

Inventors:
Frank U. Winchester,
J. Harold Hurt,
By Cromwell, Greist & Warden
Attys.

Reissued Mar. 5, 1935

Re. 19,492

UNITED STATES PATENT OFFICE 19,492

NUT AND CUP WASHER ASSEMBLY

Frank U. Winchester and J. Harold Hunt, Lansing, Mich., assignors to Motor Wheel Corporation, Lansing, Mich., a corporation of Michigan Original No. 1,961,470, dated June 5, 1934, Serial No. 522,203, March 13, 1931. Application for reissue October 22, 1934, Serial No. 749,464

7 Claims. (Cl. 151—38)

This invention relates generally to improved securing devices for automobile wheels in an assembly comprising the wheel body, the hub flange and the brake drum, and specifically to the embodiment therein of a nut and cup washer assembly possessing attributes of a resilient clamping action under force applied, whereby to effect a permanently secure assembled relation of the wheel elements unaffected by the continual vibration and shocks incident to road use of automobile wheels.

The stresses incident to wheels of this type, particularly heavy passenger cars and trucks, tend to a loosening of the connection between the hub and the wheel body and brake drum. Permanent tightness requires not only safeguarding against loosening of the nuts on the bolts but also the maintenance of a reserve degree of resiliency whereby recurring momentary severe shocks are absorbed without impairing the tightness of the connection.

It has been proposed to incorporate between the nuts and the wheel body a separate arched annulus apertured at intervals to receive the bolts; also to press into disk wheel bodies an annular rib of arcuate section apertured in a similar manner. Such expedient requires the employment of special tools and dies to produce different annuli to accord with each wheel design having bolt circles of different size and taking a larger or a smaller number of bolts; moreover, the crest of the arch is only supported at two sides leaving no support at intermediate points, as a result of which the tremendous force exerted through the nuts tends to flatten the arch on the unsupported sides of the nuts.

In assembling wheels and hubs of heavy motor vehicles a tremendous clamping force is necessarily exerted to insure against results of vibration in use. The tool employed exerts in such operation a load upon the disk of from 5,000 pounds upwards, a load of 20,000 pounds being not unusual. Such load tends to flatten or crush an annular arch; and it is to withstand such heavy load that the present device has been evolved.

According to this invention we employ, instead of a separate arch annulus or one formed integral with a wheel disk body, a series of apertured hollow conical or cup shaped members, one for each bolt and nut, which members are axially apertured and coaxially disposed with relation to the bolts and nuts, whereby force applied by a suitable tool to the nut is distributed over the area of the cup base about the bolt aperture. Preferably these members are bell shaped or frusto-spherical, the side walls presenting in axial section an ogee curve, thus utilizing to advantage the resilience of the metal under an axial load to impart a spring nut-locking function and a live stressed resistance to vibratory shocks.

For securing together wheel bodies and hubs of different size, identical devices may be employed in greater or less number as may be found most desirable, thus obviating the manufacturing and carrying in stock of different size variously apertured arcuate annuli as has been necessary under former practice. The appearance of the mounted wheel is enhanced, crushing under applied power is prevented and a more uniformly secure mounting is obtained, with effectual safeguarding against loosening under vibration.

Exhaustive tests have demonstrated resilience measured in deflection of the cup walls under load without set of the metal, approximately as follows:

| | | | |
|---|---|---|---|
| Initial load | 5,000 pounds | Deflection | .000″ |
| Initial load | 10,000 pounds | Deflection | .004″ |
| Initial load | 15,000 pounds | Deflection | .007″ |

These tests show that when a load of 15,000 pounds is applied and then reduced to 5,000 pounds there is a spring back in the metal of substantially the whole deflection, due to the resilience.

For convenience in application, the cup-like member and the nut with which it cooperates are permanently assembled in swiveled relation by forming the nut with a skirt which is introduced into the smaller end of the cup member and then expanded to prevent withdrawal. The coacting faces of the nut and cup are respectively protuberant and recessed being shaped to present complementary frusto-conical bearing surfaces oblique to the axis.

In order that the invention and the manner of its uses may be clear, we have set forth a preferred embodiment and a slight modification of the same in the accompanying drawing and in the description predicated thereon.

Figure 1:
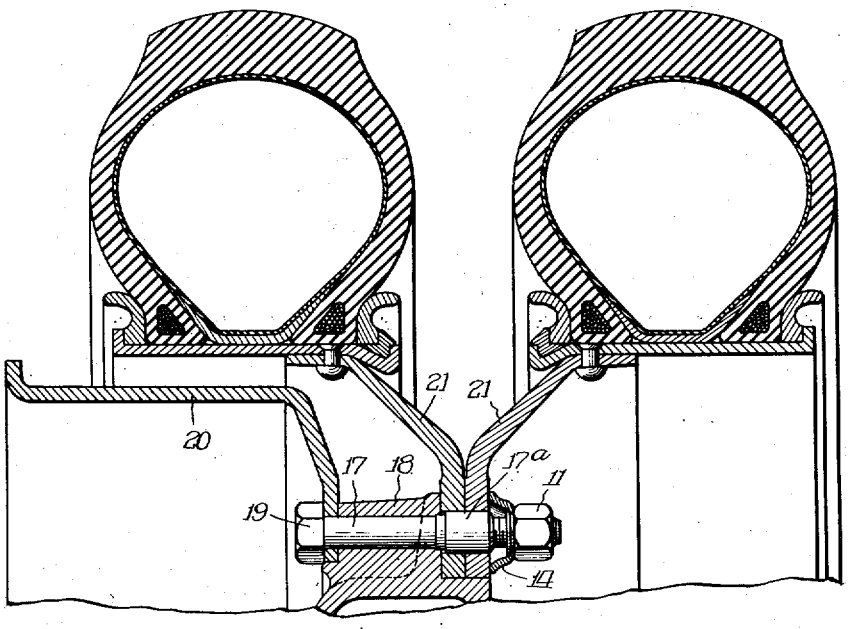
Figure 1 is a fragmentary radial section through a wheel assembly comprising a hub, brake drum and dual wheels.
Figure 2:
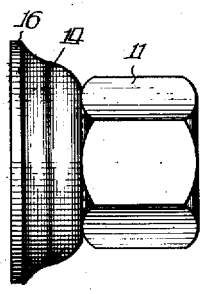
Fig. 2 is a side elevation of the nut and washer assembly.
Figure 3:
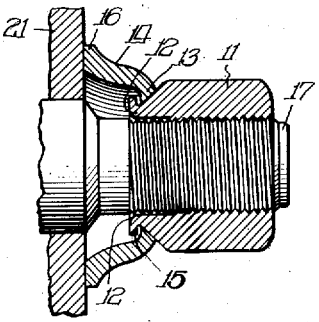
Fig. 3 is an axial section through the assembly.
Figure 4:
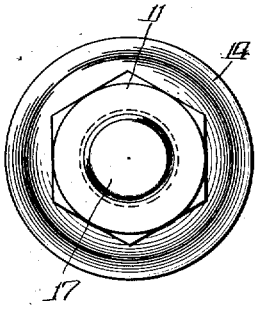
Fig. 4 is a face view of the same.

Having reference to Figs. 1 to 4 inclusive, the wheel assembly device comprises a polygonal threaded nut element 11, advantageously hexagonal, with an originally cylindrical skirt portion 12 entered within the opening at the crest or crown 13 of the cup element 14, and then expanded within the cup as indicated at 15 to provide a swivel interlock between the two elements. The shell body of the cup element is substantially of ogee axial section, the open crest 13 in-turned and the open base 16 out-turned whereby to permit a resiliency combined with rigidity in the proper degree.

In use, the nut element 11 and the cup element 14 are placed over the head of the hub stud bolt 17 which is rigidly affixed in the wheel hub member 18 as by means of a nut or head 19 which may also serve to clamp the brake drum 20 to the hub.

One or more wheel disks 21, transfixed by the shank of the stud 17 or by an enlarged portion 17*a* thereof, bear rearwardly against the hub 18. A heavy wrench applied to the nut element serves to tighten the assembly, slightly compressing the washer element axially and expanding the same transversely, within its limit of elasticity, whereby to clamp the wheel disks against the hub and firmly secure the same against vibratory loosening by virtue of the resiliency of the cup element and its tendency to spring back.

The bearing of the cup element at its open end against the wheel body is somewhat extended in the plane of the wheel disk, whereas the bearing between the smaller open end of the cup element and the nut is along a line oblique to the axis of the device, whereby the force is applied to the cup element by the nut along a line approximating the flare of the cup element.

Figure 5:
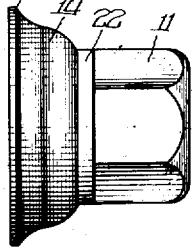
Fig. 5 is a side elevation of a slightly modified form.

In Fig. 5 is shown a slight modification in that the hexagonal portion 11 of the nut does not extend entirely to the cup element but the bearing face of the nut is annular as indicated at 22, thus serving to modify the appearance of the assembly and also functioning as a stop for the side face of a wrench whereby to prevent marring of the cup element.

The assembly by means of this device is particularly advantageous as used in connection with dual truck wheels, as illustrated in Fig. 1, where vibrations due to road shocks are especially encountered and where tendency of the assembly parts to loosen is constantly experienced. The resilience under force applied to the nut element, in the act of securing the wheels upon the hub, mounts to 15,000 or 20,000 pounds, rendering this device peculiarly adapted to the exigencies of the situation, avoiding crushing under force applied and providing against loosening of the wheel assembly in use.

We claim:

1. A device of the character set forth comprising a bell shaped resilient cup provided with an axial opening in its crown to accommodate a bolt shank, and a nut adapted to engage the bolt threads, the nut having a skirt portion extending into and expanded within the cup to effect a swivel interlock, the opening in the cup crown countersunk to present a recessed bearing face and the nut adjacent its skirt portion tapered to present a protuberant bearing face for fitting within the recessed face of the cup, the base of the cup having an annular bearing face and the area of the bearing faces between the nut and cup lying wholly within the opposite bearing face of the cup as viewed axially.

2. A device of the character set forth comprising a bell-shaped cup with an axial opening through its crown to accommodate a bolt shank, the smaller end of the cup presenting an outwardly flaring recessed bearing face and the larger end of the cup presenting a bearing face in a plane normal to its axis, and a nut adapted to be threaded upon the bolt and having a frusto-conical portion adapted to bear upon the recessed bearing face of the cup, with a concentric skirt portion expanded within the smaller end of the cup to effect a swivel interlock, the area of the bearing faces between the nut and cup lying wholly within the opposite bearing face of the cup as viewed axially.

3. A device of the character set forth comprising a bell-shaped cup of resilient metal axially bored to accommodate a clamping bolt, the opening in the smaller end of the cup presenting a recessed frusto-conical bearing face and the larger end of the cup presenting a bearing face in a plane normal to its axis, and a nut adapted to be threaded upon the bolt adjacent the smaller open end of the cup and having a frusto-conical bearing face adapted to cooperate with the adjacent recessed bearing face of the cup, the bearing area of the nut upon the crown of the cup being embraced within the area of the larger open bearing face of the cup whereby to utilize the axial thrust of the nut in an expanding direction upon the cup.

4. A device of the character set forth comprising a bell-shaped cup of resilient metal axially bored to accommodate a clamping bolt, the opening in the smaller end of the cup presenting a recessed bearing face and the larger end of the cup presenting a bearing face in a plane normal to its axis, and a nut adapted to be threaded upon the bolt adjacent the smaller open end of the cup and having a frusto-conical bearing face adapted to seat within and cooperate with the adjacent recessed bearing face of the cup, with a concentric skirt portion extending beyond the frusto-conical bearing face into and expanded within the smaller end of the cup to effect a swivel interlock, the bearing area of the nut upon the crown of the cup being embraced within the area of the larger open face of the cup whereby to utilize the axial thrust of the nut in an expanding direction upon the cup.

5. A device of the character set forth, comprising a bell-shaped resilient cup provided with an axial opening in its crown to accommodate a bolt shank, and a nut adapted to engage the bolt threads, the nut having a skirt portion extended into and expanded within the cup to effect a swivel interlock, the nut and cup having cooperating frusto-conical bearing surfaces and the nut being adapted to exert both radial and axial pressure on the cup, the base of the cup having an annular bearing face and the area of the bearing surfaces between the nut and cup lying wholly within the opposite bearing face of the cup as viewed axially.

6. A device of the character set forth comprising a bell-shaped resilient cup provided with an axial opening in its crown to accommodate a bolt shank, and a nut adapted to engage the bolt threads, the nut having a skirt portion extended into and expanded within the cup to effect a swivel interlock, the nut and cup having cooperating frusto-conical bearing surfaces, one in the form of a recess and the other in the form of a tapered surface fitted into the recess, the base of the cup having an annular bearing face and the area of the bearing surfaces between the nut and cup lying wholly within the opposite bearing face of the cup as viewed axially.

7. A device of the character set forth comprising a resilient cup provided with an axial opening in its crown to accommodate a bolt shank, and a nut adapted to engage the bolt threads, the nut having a skirt portion extended into and expanded within the cup to effect a swivel interlock, the nut and cup having corresponding frusto-conical surfaces, one in the form of a recess and the other in the form of a protuberant tapered surface fitted into the recess, the nut being adapted to exert both radial and axial pressure on the cup, the base of the cup having an annular bearing face and the area of the corresponding frusto-conical surfaces of the nut and cup lying wholly within the opposite bearing face of the cup as viewed axially.

FRANK U. WINCHESTER.
J. HAROLD HUNT.